Patented Apr. 19, 1932

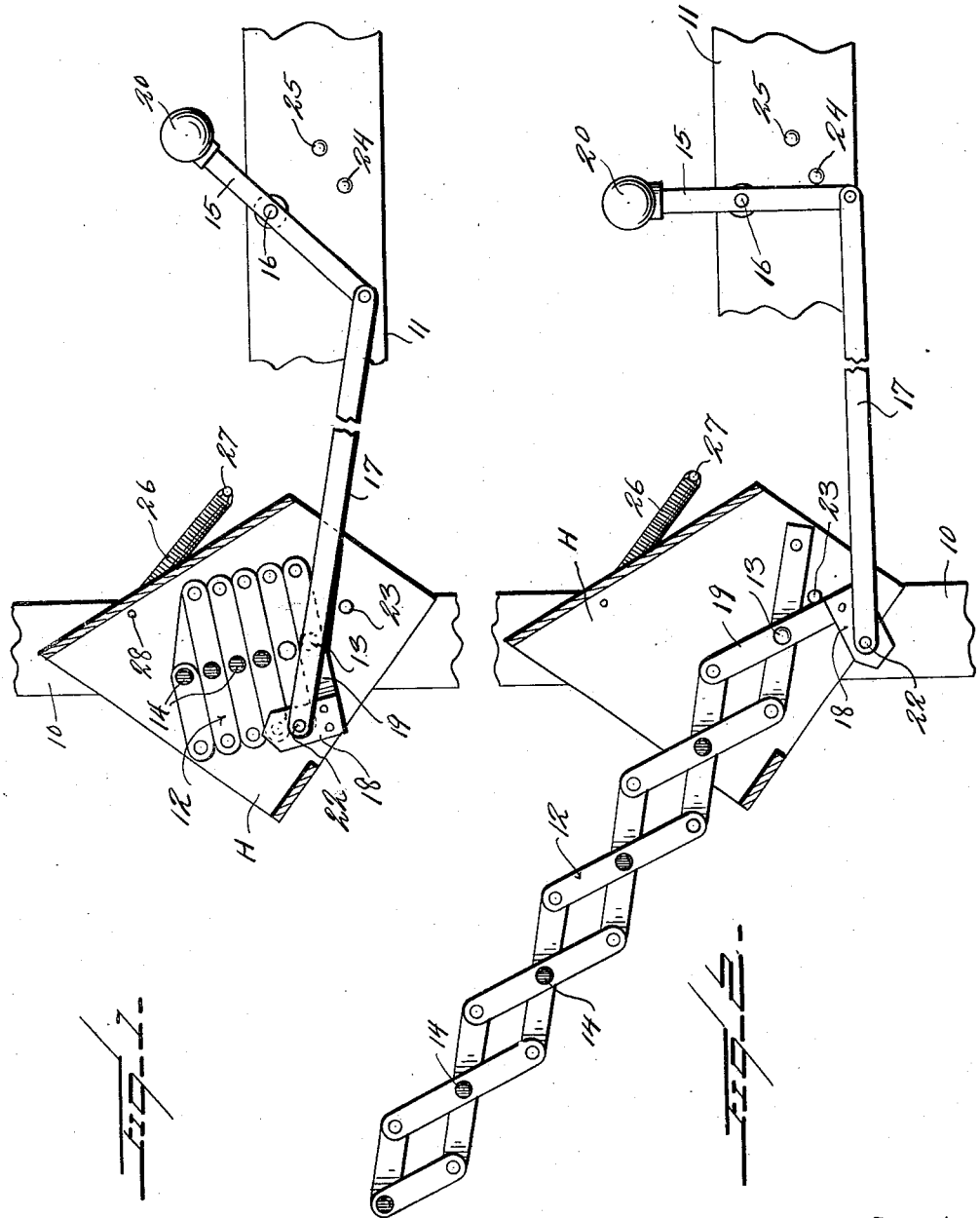

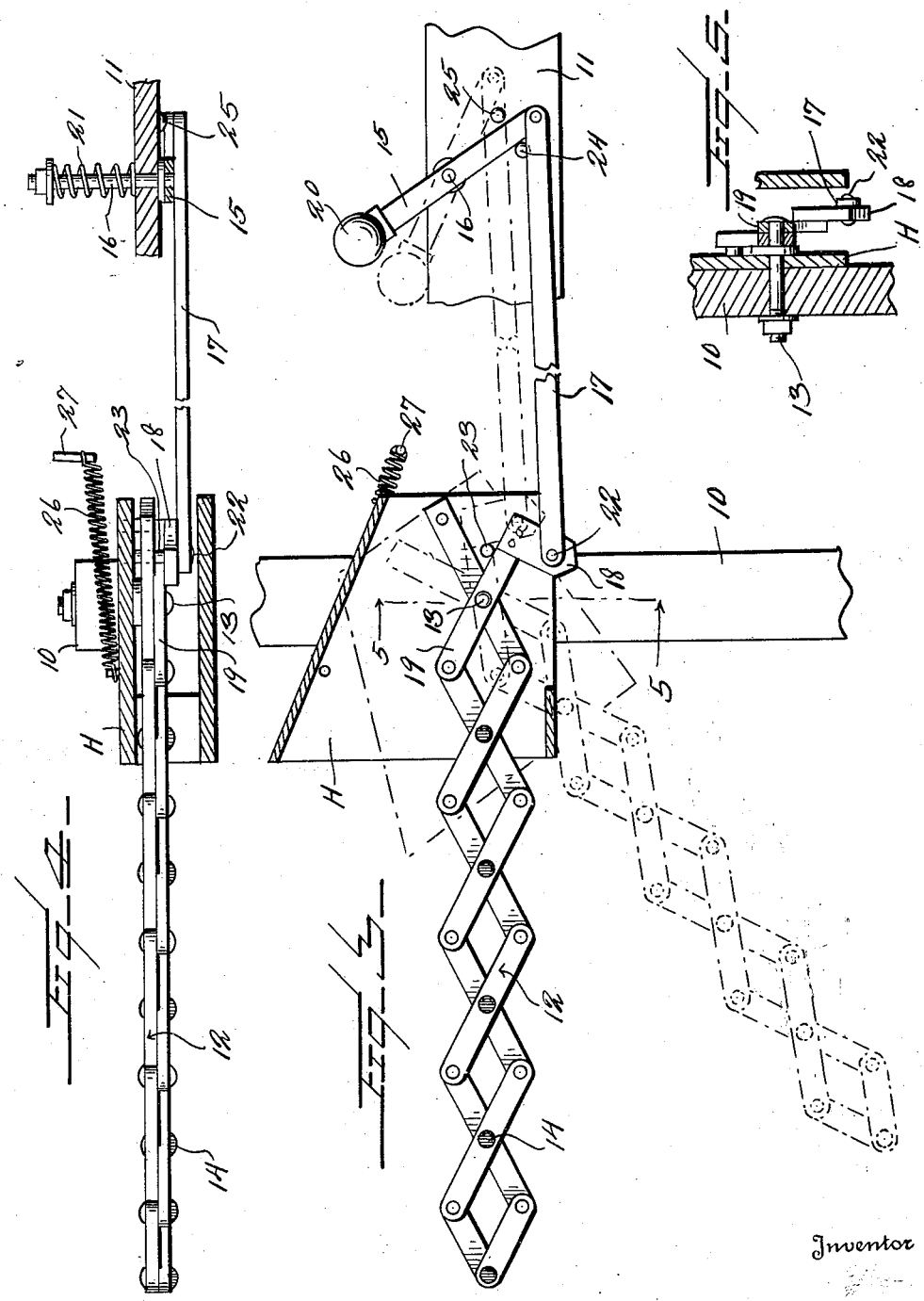

1,854,347

UNITED STATES PATENT OFFICE

JOHN H. PARTRIDGE, JR., OF LAKEVIEW, OREGON

AUTOMOBILE SAFETY SIGNAL

Application filed December 8, 1931. Serial No. 579,789.

This invention relates to signalling devices, and more particularly to an automobile signal device.

An object of this invention is to provide a mechanical signal means which may be mounted on any conventional vehicle and operated from the interior of the vehicle so as to display a member exteriorly of the vehicle so that approaching vehicles will be able to determine at a glance whether the vehicle having the signal is about to stop or make a right or left turn.

Another object of this invention is to provide a device of this kind which is manually operable and exceedingly simple in construction so that it will not detract from the appearance of the vehicle on which it is mounted, and which is so constructed that where it is mounted on a closed vehicle, the vehicle need not be opened in order to operate the signal.

The above and various other objects and advantages of this invention will in part be described in and in part be understood from the following detailed description of the present preferred embodiment, the same being illustrated in the accompanying drawings, wherein:—

Figure 1 is a detail front elevation of a device constructed according to the preferred embodiment of this invention mounted on a vehicle frame which is shown in fragmentary form, the device being partly in section and in closed position;

Figure 2 is a view similar to Figure 1 but showing the device in operative position for making of a right turn;

Figure 3 is a view similar to Figure 2, but showing the signal means in horizontal position and also in downwardly inclined position, the latter being shown in dotted line;

Figure 4 is a top plan view partly in section;

Figure 5 is an enlarged fragmentary sectional view taken on the line 5—5 of Figure 3.

Referring to the drawings wherein like numerals of reference designate corresponding parts throughout the several views, the numeral 10 designates generally the frame of a vehicle, and the numeral 11 designates the dashboard or a transversely disposed member adjacent the seat of the driver of the vehicle. Preferably, this frame member 10 is one edge portion of the door frame although I, of course, do not wish to be limited particularly to the point or place at which this device may be mounted.

In order to provide means by which the driver of the vehicle may signal approaching vehicles as to stops and turns, I have provided a signalling means comprising a lazy tong member, generally designated as 12, which is pivoted adjacent one end thereof, as at 13, to a pivot extending into the frame portion 10 of the vehicle. This lazy tong signalling means 12 comprises a plurality of connecting links which have at the central portion thereof reflecting members 14 in the form of glass of suitable color and provided with a reflecting medium at the back or rear thereof. If desired, these reflecting or signalling members 14 may be constructed in the form of electrically operated lights or the like.

In order to provide means whereby the signalling means 12 may be projected or retracted with respect to the frame 10, I have provided an operating lever 15 which is mounted on a pivot 16 carried by the dash or transverse member 11, and a link member 17 is pivotally secured at one end to the lever 15, and at the opposite end is pivotally secured to a plate or arm 18 carried by one of the links 19 of the signalling member 12. A knob or hand engaging member 20 is mounted on the lever 15 oppositely from the link 17.

A spring 21 is disposed about the pivot 16 and is adapted to constantly urge the lever 15 toward the outer face of the dash 11. A housing H is mounted on the pivot 13 carried by the frame 10, and has open opposite end portions so that the signalling member 12 may be projected outwardly through one end of the housing H and the link member 17 rock on the pivot 22 carried by the plate 18.

This housing H is provided at a point inwardly from the pivot 13 with a stop pin 23, which is adapted to be engaged by the link member 19 of the signalling member 12, so as to prevent further projection of the signalling means and to cause the signalling means 12 to rock on the pivot 13, this movement coactively rocking the housing H. In this manner, the lever 15 may be rocked on the pivot 16 so as to extend the signalling member 12 into operative position, which in the first movement, will be extended upwardly. The upward position of this signalling member 12 will indicate a right turn, and in order to signal a left turn, the signalling member 12 is swung downwardly into horizontal position, as shown in full line in Figure 3.

A pair of stop members 24 and 25 are mounted on the dash 11 in the path of the lever 15, and when the lever 15 is in substantially vertical position, the signalling member 12 is upwardly inclined so as to designate a right turn. Outward movement of the upper end of the lever 15 will cause the lower end of this lever to slide over the stop member 24 and be disposed between this stop member 24 and the stop member 25, in which position the signalling member will be substantially horizontal, as shown in Figure 3. The spring 21 will permit movement of the pivot 16 with respect to the dash 11, so that the lever 15 can ride over the rounded head of the stop member 24. Further swinging movement of the lever 15 will cause the lower end of the lever to ride over the stop pin 25 and likewise cause the signalling member 12 to be disposed in a downwardly inclined position, as shown in dotted line in Figure 3, thereby indicating a stop signal.

In order to provide means for returning the signalling member 12 to retracted position, I have provided a retracting spring 26 which is secured, as at 27, to a fixed pin carried by the vehicle, and the opposite end of this spring 26 is secured to the housing H, as at 28, adjacent the upper end thereof. In this manner, when the lever 15 has been released from the stop members 24 or 25, the spring 26 will swing the housing H, as shown in Figure 1, which movement will retract the signalling member 12.

While the signalling means has been disclosed as being operated by the manually operated lever 15, I do not wish to be limited to this particular operating means as, if desired, the signalling member 12 may be moved into operative or inoperative position by other means such as an electrically operated power member or a suction member or other mechanical operating means.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A signal means comprising an extensible member, a signal mounted on the member, means for rockably mounting the member on a support, a pivoted housing for the member, a remotely disposed operating lever, a spring engaging the housing and the support to prevent swinging of the housing and means connecting the operating lever with the member.

2. A signal means comprising an extensible member, a signal mounted on the member, means for mounting the member on a support for rocking movement with respect thereto, said means including a pivoted housing and a spring engaging the housing and the support to resist swinging of the housing, an operating lever, a link connecting the lever with the member, and means for yieldably maintaining the lever in predetermined positions.

3. A signal means comprising an extensible member, means for mounting the member on a support for rocking movement, a signal member mounted on the the first named member, an operating lever, means for pivotally mounting the lever on a support, said means including yieldable means constantly urging the lever toward the support, a link connecting the lever with the extensible member, and means for holding the lever in predetermined operative positions whereby to maintain the extensible member in predetermined signalling positions.

4. A signal means comprising an extensible member, means for mounting the member on a support for rocking movement with respect thereto, a lever, means for pivotally mounting the lever on a support, yieldable means for constantly urging the lever toward the support, a connecting link connecting the lever with the member, and stop means mounted on the latter support and positioned in the path of the lever whereby to hold the lever in predetermined operative positions.

In testimony whereof I hereunto affix my signature.

JOHN H. PARTRIDGE, Jr.